No. 852,702. PATENTED MAY 7, 1907.
P. BUNET.
INDUCTION MOTOR.
APPLICATION FILED JULY 12, 1906.
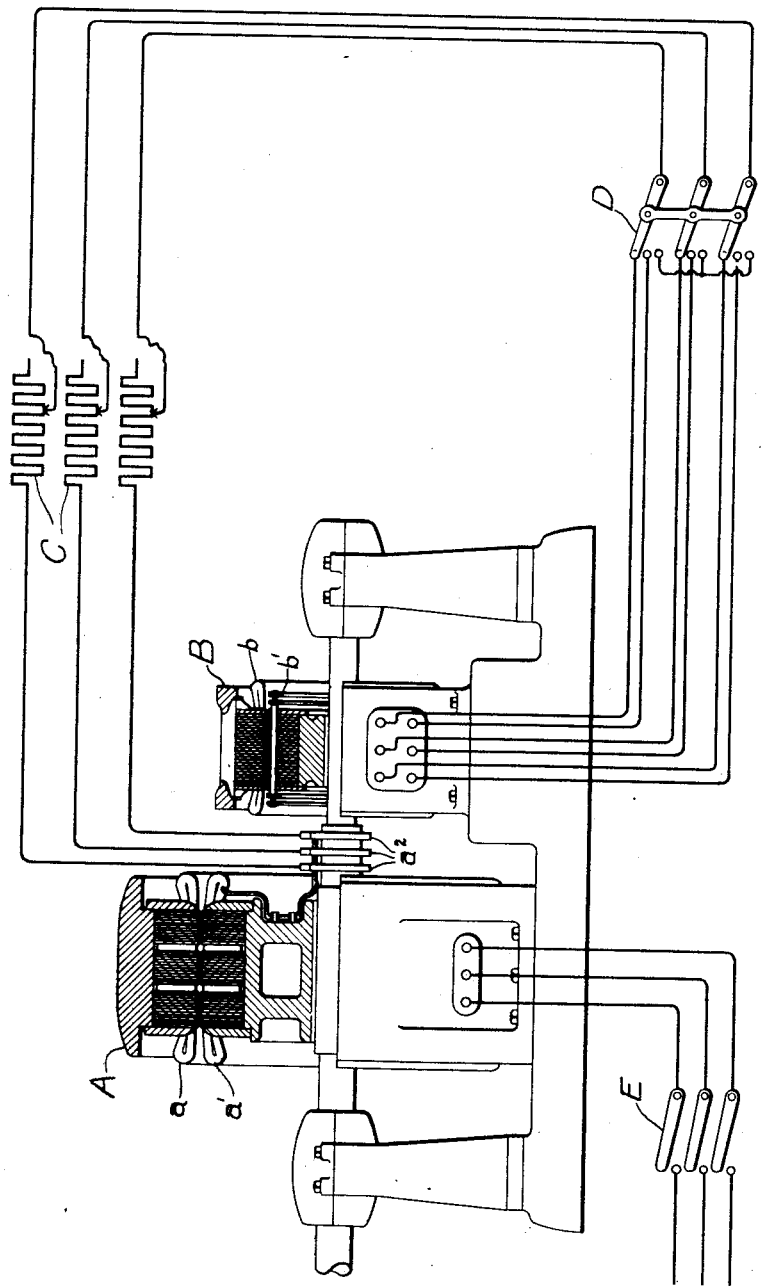
Witnesses:
Burchard V. Kelley
Helen Orford
Inventor:
Paul Bunet.
by Albert G. Davis
Att'y.

UNITED STATES PATENT OFFICE.

PAUL BUNET, OF PARIS, FRANCE, ASSIGNOR TO GENERAL ELECTRIC COMPANY, A CORPORATION OF NEW YORK.

INDUCTION-MOTOR.

No. 852,702.  Specification of Letters Patent.  Patented May 7, 1907.

Application filed July 12, 1906. Serial No. 325,845.

*To all whom it may concern:*

Be it known that I, PAUL BUNET, a citizen of France, residing at Paris, France, have invented certain new and useful Improvements in Induction-Motors, of which the following is a specification.

My invention relates to induction motors, and its object is to provide novel and efficient means for varying the speed of such motors over certain limits.

It is well known that ordinary induction motors cannot be regulated as to their speed with high efficiency at all speeds. The method of control, which consists in inserting resistances in the circuit of the rotor, lowers the speed, but at the cost of an additional consumption of energy, proportional to the decrease in speed. A method that makes it possible to obtain certain variations of speed consists in employing motors with a variable number of poles. A number of arrangements for accomplishing this result have been proposed. In this manner a certain number of speeds are obtained with high efficiency. Another well known method consists in providing the motor with a commutator, but this makes the motor much more expensive, and introduces a number of disadvantages. The cascade system of motors is well known, which makes it possible to obtain with two motors two speeds with high efficiency. This system has also been applied to two motors with variable numbers of poles, so that a number of speeds with high efficiency can be obtained. These systems have different disadvantages. Some require the use of a commutator. Others with variable numbers of poles are complicated when designed for more than two or three speeds, and especially when the motors must operate on a high-tension circuit, since providing the necessary insulation for the connections for the several numbers of poles becomes in such a case exceedingly difficult.

It sometimes happens, and it is to such cases that this invention especially relates, that it is necessary to regulate the speed only within somewhat narrow limits,—for example, within twenty-five or thirty per cent. One such case arises in the operation of ventilating fans or pumps, when it is desired to vary the output or the pressure while maintaining high efficiency. The present invention has for its object obtaining this adjustment of speed within certain limits, while avoiding the disadvantages of former methods mentioned above.

My invention consists in providing a main motor of wholly standard construction, which can easily be designed for high voltage. This motor has a constant number of poles, but its rotor, instead of being short-circuited directly, is closed through the primary winding of an auxiliary motor with a variable number of poles. The primary of this motor, like the secondary of the main motor, is designed for low voltage. Consequently, winding it for a variable number of poles becomes very simple. The rotor for the auxiliary motor may be coil-wound or of the squirrel-cage type. At starting, resistances may be placed in the circuit of the secondary of the main motor and the primary of the auxiliary motor, and gradually cut out. The two motors have their shafts mechanically connected either directly or through any suitable gearing.

The capacity of the auxiliary motor may be much smaller than that of the main motor, since it must furnish only the same amount of power that would have been wasted in rheostats if resistances were used for producing the same variations of speed. For example, assume a fan with an output of two hundred horse-power at two hundred revolutions per minute, the speed of which must be lowered to a minimum of one hundred and sixty-five revolutions per minute with two intermediate speeds, without the use of resistances, and that the motor is operating on a frequency of fifty cycles. The main motor will consequently have thirty poles; so that with its secondary short-circuited, it will run at two hundred revolutions per minute. The auxiliary motor with variable number of poles will be wound for two, four or six poles by changing the position of the controlling switch. Any suitable arrangement of windings may be employed. The two shafts are connected directly together to run at the same speed. If the secondary of the main motor is closed through the primary of the auxiliary motor connected for two poles, a speed of one hundred and eighty-seven revolutions per minute is obtained. With the auxiliary motor connected for four poles, one hundred and seventy-seven revolutions per minute are obtained. If the auxiliary motor is connected for six poles, one hundred and sixty-six revolutions per minute are obtained. The output of the auxiliary motor will be proportional to the decrease of speed obtained,—that is, approximately, in the three cases above, six and one-half, eleven and one-half, and seventeen per cent., respectively, of the output of the main motor. It should be noticed that in the majority of cases, the required power falls with the speed, and if two hundred horse-power is required; at two hundred revolutions, one hundred and eighty, one hundred and sixty, and one hundred and forty horse-power, respectively, will suffice for the other three speeds, so that the auxiliary motor would have to give about twelve, eighteen and twenty-four horse-power,—that is, less than one-eighth of the normal output of the main motor.

The accompanying drawing shows diagrammatically an induction motor arranged in accordance with my invention.

In the drawing, A represents the main motor, which is of standard construction in every way.

The primary winding $a$ may be designed for high tension, and is connected to the supply mains through the main switch E. The secondary member of the motor is coil-wound; its secondary winding $a'$ being connected to collector rings $a^2$.

B represents the auxiliary motor mounted on the same shaft with the main motor. The primary winding $b$ of this motor is, in the particular case shown, assumed to be adapted for connection for two sets of pole numbers Several different methods of thus connecting induction motors are now well known in the art, and require no description. The secondary winding $b'$ of the auxiliary motor may be of the squirrel-cage type. The secondary winding $a'$ of the main motor is connected through the variable resistance C to a controlling switch D, which is arranged to close the circuit of the secondary winding of the main motor through the primary winding $b$ of the auxiliary motor connected for either number of poles, or to short-circuit the secondary winding of the main motor. In this way three different speeds are obtained with high efficiency.

The variable resistances C may be used in starting, and if desired, in changing from one speed to another. The auxiliary motor B may be of much smaller size than the main motor A, as explained above, and yet be sufficient for obtaining a fairly wide range of speed.

I do not desire to limit myself to the particular construction and arrangement of parts here shown, but aim in the appended claims to cover all modifications which are within the scope of my invention.

What I claim as new, and desire to secure by Letters Patent of the United States, is,—

1. In combination, a main induction motor having a coil-wound secondary member, an auxiliary induction motor mechanically connected thereto and having its primary member adapted for connection for a plurality of pole numbers, and means for connecting the said primary with different pole numbers successively to the secondary of the main motor and for short-circuiting said secondary.

2. In combination, a main induction motor having a high-voltage primary member and a coil-wound low-voltage secondary, an auxiliary induction motor mechanically connected thereto and having a low-voltage primary member adapted for connection for different pole numbers, and means for connecting the primary of the auxiliary motor with different pole numbers in series with the secondary of the main motor.

3. In combination, a main induction motor having a high-voltage primary member and a coil-wound low-voltage secondary, an auxiliary induction motor mechanically connected thereto and having a low-voltage primary member adapted for connection for different pole numbers, and means for connecting the primary of the auxiliary motor with different pole numbers in series with the secondary of the main motor and for short-circuiting said secondary.

4. In combination, a main induction motor having a coil-wound secondary member, an auxiliary induction motor mechanically connected thereto and having its primary member adapted for connection for a plurality of pole numbers, means for connecting the said primary with different pole numbers successively in circuit with the secondary of the main motor, and a variable resistance in said circuit.

5. In combination, a main induction motor having a coil-wound secondary member, an auxiliary induction motor mechanically connected thereto and having its primary member adapted for connection for a plurality of pole numbers, means for connecting the said primary with different pole numbers successively in circuit with the secondary of the main motor and for short-circuiting said secondary, and a variable resistance in circuit with said secondary.

6. In combination, a main induction motor having a high-voltage primary member and a coil-wound secondary, an auxiliary induction motor mechanically connected thereto and having a low-voltage primary member adapted for connection for different pole numbers, means for connecting the primary of the auxiliary motor with different pole numbers in series with the secondary of the main motor and for short-circuiting said secondary, and a variable resistance in circuit with said secondary.

In witness whereof, I have hereunto set my hand this 30 day of June, 1906.

PAUL BUNET.

Witnesses:
HERNANDO DE SOTO,
WERNER HILDEBRAND.